United States Patent

Bauer et al.

[11] 4,090,773
[45] May 23, 1978

[54] INFRARED-REFLECTING GLAZING

[75] Inventors: Peter Bauer, Darmstadt; Udo Fischer, Bickenbach; Ludwig Hosch, Darmstadt, all of Germany

[73] Assignee: Rohm GmbH, Darmstadt, Germany

[21] Appl. No.: 725,188

[22] Filed: Sep. 21, 1976

[30] Foreign Application Priority Data

Oct. 3, 1975 Germany .............................. 2544245

[51] Int. Cl.² .............................................. G02B 5/26
[52] U.S. Cl. ...................................... 350/1.6; 428/324
[58] Field of Search .................... 350/1; 428/324, 328; 252/300 R; 260/42.22

[56] References Cited

U.S. PATENT DOCUMENTS

| 2,367,047 | 1/1945 | Pellett | 428/324 |
| 3,060,552 | 10/1962 | Scheyer | 350/1 X |
| 3,329,648 | 7/1967 | Chopoorian | 350/1 X |
| 3,481,663 | 12/1969 | Greenstein | 428/324 X |
| 3,958,062 | 5/1976 | Moynihan | 350/1 X |
| 4,017,326 | 4/1977 | Davis | 428/324 X |

Primary Examiner—John K. Corbin
Assistant Examiner—John D. Lee
Attorney, Agent, or Firm—Curtis, Morris & Safford

[57] ABSTRACT

Polymethylmethacrylate sheet comprising light-reflecting particles arranged parallel to the surfaces of the sheet, said particles having a thickness $d$ and an index of refraction $n$, at a wavelength of infrared light from 800 to 1500 nm, such that $d = (0.2 \text{ to } 0.4)(1/n)$ microns, said sheet being adaptable for use as a glazing material for buildings or vehicles.

3 Claims, 2 Drawing Figures

INFRARED-REFLECTING GLAZING

The present invention relates to a glazing material, for use on buildings or vehicles, which material will reflect infrared radiation.

It is known to use mineral glass panes having a thin vaporized gold layer thereon for this purpose. The thickness of the gold layer is so measured that it reflects light in the infrared region to a considerable extent and predominantly passes visible light therethrough. Mineral glass panes of this type are difficult to prepare and are not suitable for all fields of use. In cases in which the panes are exposed to mechanical stress, the gold layer can easily be disturbed. Gold layers of this type on panes of transparent organic materials (organic glasses) are particularly sensitive. If these panes are bent or arched into a three-dimensional structure, a uniform vaporization of gold thereon is particularly difficult to achieve. For the aforementioned reasons, infrared-reflecting glazing materials have heretofore not been used in many cases in which they per se would be desirable, for example in shed roofing or light domes of acrylic glass, or on the curved upper panes of autobuses or passenger ships. For these purposes, complete clarity of the panes is not absolutely necessary; a light diffusing effect is, indeed, desired in many cases.

It is also known to prepare panes from polymethylmethacrylate having a content of so-called "pearlescent pigments" which are arranged in a manner parallel to the surface. Panes of this type having a white or optionally colored pearlescent effect have heretofore been used exclusively for buttons, fasteners, combs, and similar fashion articles, where use is made only of their decorative appearance. In contrast, it is not yet known to use panes of this type for glazing purposes.

It has now been found that panes of this type made with particular kinds of pearlescent pigments reflect infrared radiation quite extensively. With the aid of such panes, the problem of glazing buildings or vehicles with an infrared-reflecting material which is transparent to visible light has been solved according to the present invention.

A better understanding of the present invention and of its many advantages will be had by referring to the following drawings, in which.

Figure 1:
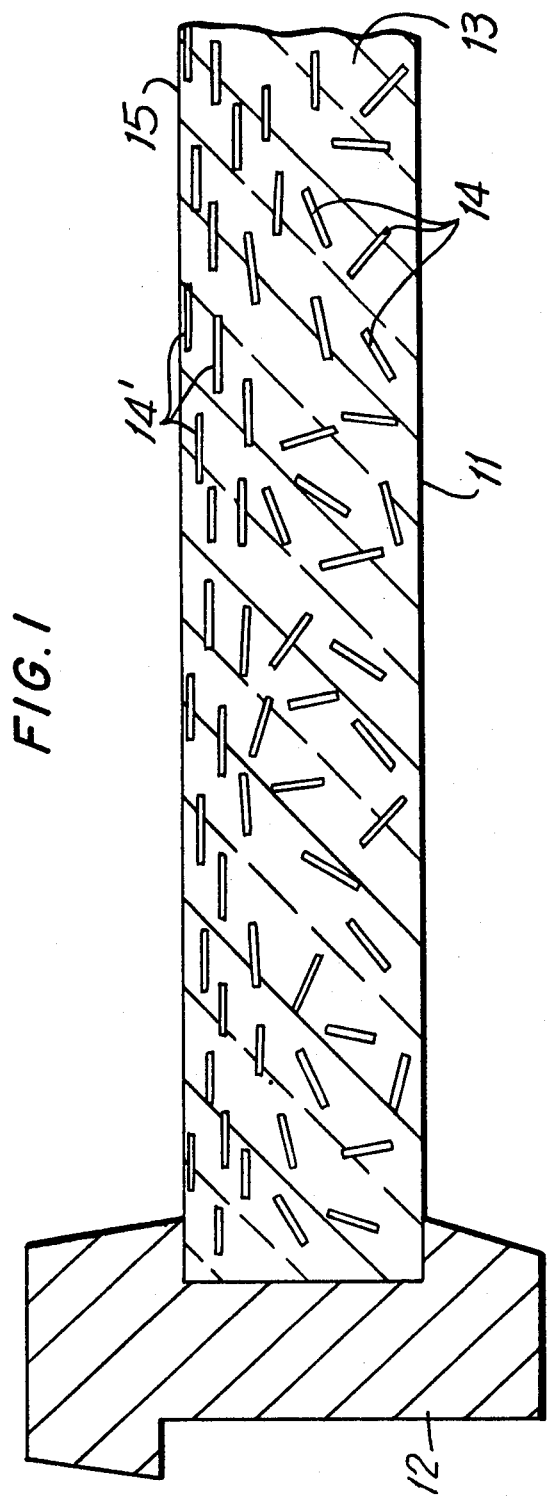
FIG. 1 is a side view in section showing an infrared reflecting window.

More in particular, FIG. 1 shows infra-red reflecting pane 11, mounted in window frame 12.

Pane 11 comprises a transparent matrix 13 of polymethylmethacrylate in which are dispersed particles 14 which are of a thickness tending to reflect incident infra-red light thereon while transmitting light in the visible region.

Although particles 14 (which are shown in FIG. 1 in enlarged size for purposes of clarity) are randomly oriented on a statistical basis through most of matrix 13, those particles 14' present in a thin layer adjacent to surface 15 on which ambient light, such as sunlight, is incident are more oriented to have their reflecting surfaces parallel to surface 15 of pane 11.

Figure 2:
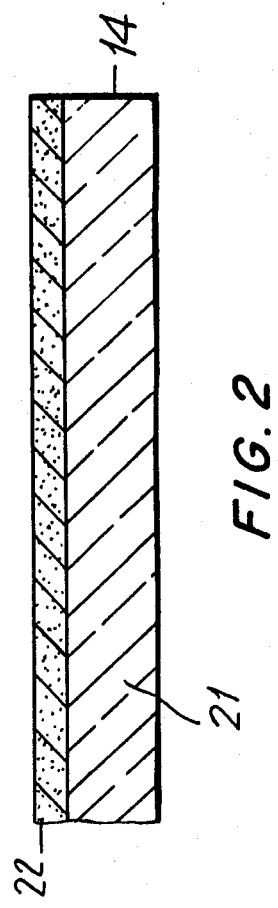
FIG. 2 is enlarged side view in section of a coated infra-red reflecting particle present in the windows of the invention.

FIG. 2 shows a preferred particle 14, much enlarged. The particle comprises mica flake substrate 21 on which is present thin layer 22 of titanium dioxide. It is this layer 22, of thickness $d$, which imparts infra-red reflecting characteristics to particle 14 and pane 11 in which such particles are incorporated.

A feature of the invention, thus, is the use as glazing material for buildings or vehicles of panes of polymethylmethacrylate having a content of light-reflecting particles arranged parallel to the surface of the pane and having a thickness of $d$ and an index of refraction $n$ (for infrared light of a wavelength of 800 - 1500 nm), whereby, between these values, the following relationship holds $d = (0.2 \text{ to } 0.4) (1/n)$ [microns].

Physically, the infrared reflection is due to a doubled reflection of the light on the upper and lower surfaces of the particles, which are arranged parallel to the upper surface. According to the thickness of the particles and the wavelength of the irradiating light, the rays reflected on the upper side and the lower side of the particles can either strengthen or extinguish themselves by interference. An increase in the reflected radiation occurs when $d = (2x-1) \lambda_r/4n$ wherein $d$ is the thickness of the particles, $x = 1$, $\lambda_r$ is the wavelength of the reflected radiation, and $n$ is the index of refraction of the particles at this wave-length. In contrast, extinguishing or a weakening of the reflected light ray occurs when $d = (x - 1) \lambda_t/2n$, wherein, here, $x = 2$ and $\lambda_t$ is the wavelength of the light, which in this case is not reflected, but is transmitted. From a combination of the two equations, it follows that $\lambda_t = 2\lambda_r$. From this it follows that at a particular layer thickness $d$, light of the wavelength $\lambda_r$ is most strongly reflected and light of half of that wavelength, $\lambda_t$, is most strongly transmitted. The color effects obtained with pigments of this type are due to the fact that, at a suitable layer thickness $d$, the wavelength $\lambda_t$ falls in the visible region, whereupon light of this wavelength will, thus, not be reflected, or will be reflected only to a lower degree. The light reflected by the pearlescent pigment now contains only the wavelengths which are reflected on the particles, which form a complementary color to the transmitted light. This effect is, in the case of the present invention, only subsidiary. The thickness of the particles is so chosen according to the invention that the light passing through the particles is in the visible region and the light which is most strongly reflected from the particles falls in the infrared region. In this way, the amount of the heat rays of sunlight which penetrate through the glazing into the space beneath is considerably reduced, whereas the visible light is lessened only relatively little.

Different pigments are known that fill the required relationship between thickness and index of refraction. To these belong titanium dioxide, particularly of the anatase-type, basic lead carbonate, or bismuth oxychloride. Particularly advantageous is titanium dioxide which has been precipitated on mica particles or on similar plate-shaped mineral materials defined in layer thicknesses. The layer thickness, $d$, refers only to this $TiO_2$-layer, not to the mica underlayer. This pigment gives light-diffusing panes which are particularly well suited for all kinds of roof glazing and skylights. It is important, not only for the achievement of a pearlescent effect, but also for infrared reflection, that the particles have the most possibly even surface, a most possibly uniform layer thickness on each particle, per se as well as in comparison with other particles, and not too small a size. The particle edges have a light-diffusing effect, whereby the sought-for reflection effect is reduced. The particles should, on the other hand, also not be so large that they are recognizable to the naked eye, since the sheets then appear non-uniform on inspection and by transmitted light.

The particles can be introduced into the polymethylmethacrylate in different ways. The pigment can be dispersed in monomeric or in partially-polymerized methylmethacrylate and the suspension then can be polymerized in a manner known per se between two glass plates or the like, whereby, however, the particles take a random position. They are arranged parallel to the surface of the sheet if the walls of the chamber, between which the material is polymerized, are moved in a parallel relationship with respect to each other before conversion into the gel condition. In the preparation of shaped bodies, this technique can be dispensed with. One obtains a shaped body in which the pigment is not yet oriented. In further working up by calendering, extruding, or injection molding, the particles are largely arranged to be parallel to the surface. Also, the pigment particles can be oriented, or a partial orientation can be increased, by a two-dimensional stretching of a corresponding synthetic resin sheet.

A complete orientation of all the pigment particles is not necessary. If the sheet is prepared by the polymerization of a horizontal layer, the fraction of the pigment particles arranged parallel to the surface is larger than would be expected statistically as a result of a natural setting process. The reflecting effect brought about in this manner is sufficient for many purposes. It is strongly increased if at least the pigment particles in one thin layer near to the surface are arranged parallel to this surface. The amount of pigment used depends on the desired strength of the effect, as well as on the degree of orientation. Amounts of from 0.01 to 1 percent, by weight of polymer, are sufficient as a rule. To be sure, with an increasing pigment content, the infrared reflection increases. However, as a result of light absorption, the total amount of light transmission decreases.

The effect of an infrared-reflecting pigment additive can be made evident by reference, for example, to a sheet of polymethylmethacrylate comprising 0.6 percent by weight of mica coated with titanium dioxide having a $TiO_2$—layer thickness of about 120 nm. The amount of visible light of 500 nm which penetrates the sheet is 64 percent of the incident light of this wavelength. In contrast, only 27 percent of incident infrared light of a wavelength of 100 nm is transmitted.

The methacrylate panes provided with an infrared-reflecting pigment can be bent, bowed, or formed into light domes and the like in known fashion. The high resistance to weathering of the synthetic resin is not influenced by the pigment adddivites. The reflecting effect is lost neither under the influence of long-extended weathering nor by mechanical damage to the surface. Further additives conventional in polymethylmethacrylate, such as UV-absorbers, soluble dyes, or additional opacifying agents in the form of pigments or polystyrene particles, can be used in the usual fashion. In the same way, copolymers can be used instead of pure polymethylmethacrylate, which copolymers, in addition to methylmethacrylate, contains small amounts of other comonomers.

In addition to use as glazing panes in conventional windows, uses in which the material more or less has the character of a construction element fall within the scope of the invention. Above all, sheets having a hollow cross-section are to be mentioned, which sheets are prepared by extrusion and comprise two planar outer surfaces having bonding webs vertically arranged therebetween. Hollow sheets of this type can be used as window glazing, but also form the essential wall elements of, for example, greenhouses or indoor swimming pools. The preferred use is as the glazing of skylights having dome-shaped elements. In all cases, not only is an excessive warming of the glazed space because of strong sunlight avoided, but also the loss of heat from the enclosed space by heat radiation is detectably decreased.

A better understanding of the present invention and of its many advantages will be had by referring to the following specific examples, given by way of illustration.

EXAMPLE 1

Methylmethacrylate is pre-polymerized to a syrup-like consistency. 0.3 percent, by weight of the pre-polymerized ester, of a commercial reflecting pigment which comprises reflecting particles having a 120 nm thick $TiO_2$-layer thereon (anatase-type) are carefully stirred in. In order to avoid a destruction of the pigment particles on stirring, the pigment can first be mixed with the same amount of a plasticizer, such as dibutyl phthalate, and the paste stirred into the prepolymer. The mixture is polymerized in known fashion in the form of a 6 mm thick layer between two glass plates having a peripheral sealing gasket. The polymerization temperature is about 60° C. at the beginning and is increased toward the end to 120° C.

The 5 mm thick sheet so obtained is of a rose color in incident light and shows a weak, slightly cloudy, pearlescent effect. The transmitted light is weakly blue-green colored. The degree of spectral transmission in the visible region ($\tau_c$) and the degree of transmission of the total spectral radiation ($\tau_e$) were measured. The quotient between these values is the selectivity index (S.I. $= \tau_c/\tau_e$). This index is greater the greater the degree of transmission of visible light in comparison to the degree of the transmission of the total sunlight, including infrared radiation. A high selectivity index accordingly means a good reflection of infrared by the pane. In the case at hand, a selectivity index of 1.33 – 1.36 was measured.

EXAMPLE 2

The process according to Example 1 was repeated, except that the polymerization was interrupted shortly before the point in time at which the polymerizing mixture reached the gel condition. The clamps were removed and the glass plates, with the peripheral gasket surrounding the highly viscous prepolymer, were moved parallel to each other several times in a circular motion. Subsequently, the polymerization was carried out until complete reaction. The plate obtained showed a strong rose satin effect in incident light. The selectivity index was determined as 1.46.

EXAMPLE 3

The process according to Example 2 was repeated, except that a colloidal slurry containing 0.01 percent of carbon black, by weight of the prepolymer, was added to the starting material. The selectivity index was in this way further increased.

EXAMPLE 4

The plate material prepared according to Example 1 having a thickness of 4.91 mm and a selectivity index of 1.33 was biaxially stretched at 160° C. to a final thickness of 1.39 mm. The stretched material had a selectivity index of 1.55. If the starting material is worked to a thickness of 1.4 mm under tension, a selectivity index of 1.105 is found. The difference in favor of the stretched material is attributable to the particle orientation which occurs in the stretching process.

What is claimed is:

1. In the method of reducing the penetration of infra-red radiation into buildings or vehicles with glazing which is transparent to visible light but infra-red reflecting, the improvement wherein said buildings or vehicles are glazed with polymethylmethacrylate sheet comprising plate-shaped particles of a light-reflecting pigment, said pigment having a thickness $d$ and an index of refraction $n$, at a wavelength of infra-red light from 800 to 1500 nm, such that $d = (0.2 \text{ to } 0.4)(1/n)$ microns, said particles being at least in part arranged parallel to the surfaces of the sheet.

2. A method as in claim 1 wherein said particles are particles of mica having a layer of titanium dioxide pigment of layer thickness $d$ thereon.

3. A method as in claim 1 wherein those particles in a thin layer near the surface of said sheet are oriented parallel to said surface, other particles being statistically randomly oriented.

* * * * *